United States Patent
Lam (10) Patent No.: US 12,265,725 B2
(45) Date of Patent: *Apr. 1, 2025

(54) ACCELERATED READ TRANSLATION PATH IN MEMORY SUB-SYSTEM

(71) Applicant: Micron Technology, Inc., Boise, ID (US)

(72) Inventor: Johnny A. Lam, Firestone, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,759

(22) Filed: Mar. 24, 2022

(65) Prior Publication Data
US 2022/0214830 A1 Jul. 7, 2022

Related U.S. Application Data

(63) Continuation of application No. 16/912,402, filed on Jun. 25, 2020, now Pat. No. 11,314,446.

(51) Int. Cl.
*G06F 3/06* (2006.01)
*G06F 12/02* (2006.01)
*G06F 12/1009* (2016.01)

(52) U.S. Cl.
CPC .......... *G06F 3/0655* (2013.01); *G06F 3/0604* (2013.01); *G06F 3/061* (2013.01);
(Continued)

(58) Field of Classification Search
USPC ....................................................... 711/154
See application file for complete search history.

(56) References Cited

U.S. PATENT DOCUMENTS 8,838,937 B1 9/2014 Katz et al.
9,529,721 B2 * 12/2016 Watanabe ........... G06F 12/0862
(Continued)

FOREIGN PATENT DOCUMENTS

| CN | 102084330 A | 6/2011 |
|---|---|---|
| CN | 103026346 A | 4/2013 |
| CN | 110799953 A | 2/2020 |

OTHER PUBLICATIONS

Zhang et al. "Optimizing Translation Information Management in NAND Flash Memory Storage Systems," IEEE Design Automation Conference (ASP-DAC), 2013 18th Asia and South Pacific (pp. 326-331).

(Continued)

*Primary Examiner* — Yaima Rigol
*Assistant Examiner* — Elias Young Kim
(74) *Attorney, Agent, or Firm* — Lowenstein Sandler LLP (57) ABSTRACT

A system includes a non-volatile memory device and a processing device to perform operations including creating a logical transfer unit (LTU) corresponding to a logical block address (LBA) received in a read request, wherein the LTU comprises a subset of a plurality of sequential LBAs of a zone of LBA space of the non-volatile memory device, wherein one of the subset is the LBA. The processing device comprises a hardware accelerator to perform operations comprising: retrieving, using an LTU identifier associated with the LTU, metadata that specifies a mapping between the LTU identifier and a physical address of a physical address space; and providing the metadata for use in determining and utilizing the physical address to perform a read operation specified by the read request.

20 Claims, 6 Drawing Sheets

(52) U.S. Cl.
CPC ........ *G06F 3/0679* (2013.01); *G06F 12/0246* (2013.01); *G06F 12/1009* (2013.01); *G06F 2212/1016* (2013.01); *G06F 2212/7201* (2013.01)

(56) References Cited

U.S. PATENT DOCUMENTS

| | | | | |
|---|---|---|---|---|
| 9,823,852 | B2* | 11/2017 | Okita | G06F 3/0679 |
| 9,946,462 | B1* | 4/2018 | Li | G06F 12/0246 |
| 10,990,537 | B1 | 4/2021 | Moertl et al. | |
| 10,997,080 | B1 | 5/2021 | Eliash et al. | |
| 11,048,623 | B2* | 6/2021 | Yang | G06F 12/0246 |
| 11,113,209 | B2 | 9/2021 | Evans et al. | |
| 11,656,999 | B2* | 5/2023 | Lee | G06F 12/10 711/206 |
| 2005/0210218 | A1* | 9/2005 | Hoogterp | H04L 67/1097 711/159 |
| 2007/0106871 | A1* | 5/2007 | O'Connor | G06F 12/1441 711/E12.095 |
| 2009/0150641 | A1 | 6/2009 | Flynn et al. | |
| 2009/0327598 | A1* | 12/2009 | Tamura | G11B 20/1217 711/170 |
| 2011/0161562 | A1* | 6/2011 | Chang | G06F 11/1004 711/170 |
| 2011/0289255 | A1* | 11/2011 | Wang | G06F 12/0246 711/E12.001 |
| 2013/0080732 | A1 | 3/2013 | Nellans et al. | |
| 2014/0075102 | A1 | 3/2014 | Oh et al. | |
| 2016/0179697 | A1 | 6/2016 | Park | |
| 2016/0342509 | A1 | 11/2016 | Kotte et al. | |
| 2017/0060749 | A1* | 3/2017 | Segev | G06F 3/0659 |
| 2017/0220264 | A1* | 8/2017 | Sokolov | G06F 3/061 |
| 2018/0095678 | A1 | 4/2018 | McClain et al. | |
| 2019/0155723 | A1* | 5/2019 | Park | G06F 12/0866 |
| 2019/0189167 | A1 | 6/2019 | Suhler et al. | |
| 2019/0227940 | A1* | 7/2019 | Kim | G06F 12/0246 |
| 2019/0286570 | A1* | 9/2019 | Miura | G06F 12/0246 |
| 2019/0294554 | A1 | 9/2019 | Bryant et al. | |
| 2020/0034230 | A1 | 1/2020 | Jeyapaul et al. | |
| 2020/0057725 | A1* | 2/2020 | Cho | G06F 12/0246 |
| 2020/0097188 | A1 | 3/2020 | Gunda et al. | |
| 2020/0409856 | A1* | 12/2020 | Navon | G06F 12/123 |
| 2021/0011638 | A1* | 1/2021 | Hinds | G06F 9/30098 |
| 2021/0011859 | A1* | 1/2021 | Li | G06F 12/0246 |
| 2021/0056023 | A1* | 2/2021 | Jin | G06F 11/1446 |
| 2021/0278993 | A1* | 9/2021 | You | G06F 3/0655 |

OTHER PUBLICATIONS

Lee, et al. "Adaptive write interference management with efficient mapping for shingled recording disks," 2019 IEEE 37th International Conference on Computer Design (ICCD), IEEE, 2019, Section V. A.

Zhang et al. "Optimizing Translation Information Management in NANO Flash Memory Storage Systems," International Conference on Automated Software Engineering, 2011, Section III. B.

* cited by examiner

Store, within a system tag data structure, a system tag including a logical transfer unit (LTU) identifier corresponding to an LTU, where the LTU is a subset of multiple sequential logical block addresses (LBAs) that includes an LBA of a read request. 410

↓

Map, within at least one mapping data structure, a zone of an LBA space to a physical address space of the memory sub-system, where the zone includes multiple sequential LBAs that are sequentially mapped to multiple sequential physical addresses. 420

↓

Retrieve, by hardware accelerator, the LTU identifier from the system tag stored in the system tag data structure. 430

↓

Determine, by the hardware accelerator, a zone identifier (ID) based on the LTU identifier. 440

↓

Index, by the hardware accelerator using at least one of the zone ID or the LTU identifier, into the mapping data structure to retrieve metadata that specifies a mapping between the LTU identifier and a physical address of the physical address space. 450

↓

Store, by the hardware accelerator, the metadata in the system tag data structure in association with the system tag. 460

ACCELERATED READ TRANSLATION PATH IN MEMORY SUB-SYSTEM

RELATED APPLICATIONS

The present application is a continuation of U.S. patent application Ser. No. 16/912,402, filed Jun. 25, 2020, which is incorporated by reference herein.

TECHNICAL FIELD

Embodiments of the disclosure relate generally to memory sub-systems, and more specifically, accelerated read translation path in memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to accelerated read translation path in memory sub-system. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

The memory devices can be non-volatile memory devices that can store data from the host system. One example of a non-volatile memory device is a negative-and (NAND) memory device. Other examples of non-volatile memory devices are described below in conjunction with FIG. 1A. Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1," or combinations of such values.

Various access operations can be performed on the memory cells. For example, data can be written to, read from, and erased from memory cells. Memory cells can be grouped into a write unit, such as a page. For some types of memory devices, a page is the smallest write unit. A page is a set of cells across the same word line. A page size represents a particular number of cells of a page. For some types of memory devices (e.g., NAND), memory cells can be grouped into an erase unit, such as a physical unit, e.g., a physical block, which is a group of pages. A physical block is a 2-dimensional memory array of pages (rows of cells) and strings (columns of cells). Data can be written to a block, page-by-page. Data can be erased at a block level. However, portions of a block cannot be erased.

Multiple blocks can be grouped together to form a plane. One or multiple planes can be grouped together to form a physical die of the memory device. A memory device can include one or more dice. A single die or multiple die stacked on top of each other can be grouped to form a package. A die is also hereinafter referred to as a logical unit (LUN). A LUN can contain one or more planes.

A memory sub-system can use a striping scheme to treat various sets of data as units when performing data operations (e.g., write, read, erase). A LUN stripe is a collection of planes that are treated as one unit when writing, reading, or erasing data. Each plane in a LUN stripe can carry out the same operation, in parallel, of all of the other planes in the LUN stripe. A block stripe is a collection of blocks, one from each plane in a LUN stripe, that are treated as a unit. The blocks in a block stripe have the same block identifier (e.g., block number) in their respective planes. Thus, a block stripe (also hereinafter referred to as a block set) can be a set of blocks arrayed across planes of different dice, such that the blocks are grouped together for purposes of data storage. Writing to block sets is so that more data can be concurrently written and read at the same time across multiple dice. Multiple blocks of one or more block set can be identified as a data group.

The host file system can group data by locality and write the data sequentially to the memory devices of the memory sub-system. File systems can then write data of different localities as parallel sequential streams to memory devices, each stream having its own locality, e.g., where different applications can each write to its own stream. "Locality" can refer to either temporal locality or spatial locality. Conventionally, a controller (e.g., that includes one or more processing device) writes to the IC dice randomly in portions of data, e.g., 4 KB. The controller can use metadata to map one or more logical block addresses (LBAs) of LBA space to the physical address space of the IC dice where the data is stored. When a larger group of data (e.g., 100 MB or more) is written that has data locality, however, the "data group" can be sequentially written as a larger chunk to one or more block sets across multiple dice. In order to simplify mapping of such data groups, LBAs of a zone (e.g., a logical address space fragment associated with a data group) that are sequentially ordered within the LBA space can be mapped to sequentially ordered physical addresses within the physical address space. Memory devices that can write (e.g., program) zones of data at a time and map the zones accordingly can be said to operate in zone namespace (ZNS), e.g., where a zone of logical addresses are named/identified as a group.

In conventional memory devices, read requests (or read operations) are fulfilled one command tag at a time to a translation processor of the controller, resulting in random reads at a granularity specified by the command tag. A logical transfer unit (LTU) is a subset of multiple sequential LBAs that can be mapped to a physical address via a set of mapping data structures. The command tag, also referred to as a system tag (e.g., systag), includes an LTU identifier (associated with an LTU) and a buffer address identifying a buffer (e.g., a slot in volatile memory) in which the data associated with the translation unit are stored as if in a cache. The controller can return the data to the host system (or other requesting agent) out of the memory buffer. The LTU identifier is mapped, by a logical-to-physical (LTP) mapping data structure, to a physical address of the physical address space.

One of the benefits of employing ZNS within a memory device is low latency read performance, particularly if a read request to sequential data results in reading a larger chunk of data, e.g., corresponding to multiple command tags in a read lookahead fashion. Currently, static LTP mapping data structures are stored in memory for use in quickly mapping an LTU identifier to a physical address, in the physical address space. In one embodiment, these LTP mapping data structures are implemented as hash tables. Because these data structures reside in memory (e.g., dynamic random access memory or DRAM), the speed of lookups (e.g., indexing) within the mapping data structures is only as fast as the memory that stores the data structures.

In various embodiments, the latency of fulfilling read requests can be made even lower with acceleration of processing read commands in hardware, e.g., a hardware accelerator located within the controller. Further, some of the mapping data structures (that are not too large) can be stored and indexed within a faster volatile memory located closer to the processor of the controller such as a static random access memory (SRAM) device or tightly coupled memory (TCM) device. Larger mapping data structures can be stored in system main memory such as DRAM. The hardware accelerator can include hardware logic to perform the hash-based indexing into the mapping data structures, retrieve metadata that specifies a mapping between the LTU identifier and a physical address, and store the metadata into a system tag data structure, e.g., indexed in relation to a system tag associated with the read request. These mapping data structures can be shared by agents (e.g., the controller or an I/O controller that shares the memory device) that can index into them by storing a system tag within the system tag data structure as described in detail below. The metadata written to the system tag data structure in relation to a system tag can then be used by a command execution processor of the processing device to retrieve and buffer data that is read from the physical address for returning to the host system.

In one embodiment, a system includes a non-volatile memory device and a volatile memory device (e.g., TCM or SRAM) both coupled to a processing device, e.g., of the controller. The volatile memory device can store a mapping data structure that maps a zone of a logical block address (LBA) space to a physical address space of the memory device. The mapping data structure can include any or a combination of logical-to-physical (LTP) data structures used to map logical addresses to physical addresses. The zone includes multiple sequential LBAs that are sequentially mapped to multiple sequential physical addresses. The volatile memory device can also store a system tag data structure (e.g., a table) to contain a system tag to be mapped to a physical address as well as other system tags received in read requests.

In the embodiment, the processing device receives a read request having an LBA. A command generation processor of the processing device can create an LTU from the LBA, where the LTU includes a subset of the multiple sequential LBAs that includes the LBA from the read request. The processing device can also store a system tag, which contains an LTU identifier for the LTU, in the system tag data structure. The hardware accelerator that is located in the processing device can then perform the mapping on behalf of the processing device to speed up generation of the metadata that maps the LTU to the physical address.

In various embodiments, for example, the accelerator can retrieve the LTU identifier in response to the processing device writing the system tag into the system tag data structure and determine an zone ID based on the LTU identifier. The accelerator can then index, using at least one of the zone ID or the LTU identifier, into the mapping data structure to retrieve metadata that specifies a mapping between the LTU identifier and a physical address of the physical address space. The accelerator can store the metadata in the system tag data structure in association with the system tag. Once stored, the processing device can retrieve the metadata with which to populate a read command to be sent to the command execution processor to fulfill the read request.

Advantages of the present disclosure include but are not limited to further lowered latency in fulfilling read requests. A simple and configurable general purpose logical-to-physical address acceleration translator can be leveraged for ZNS memory devices and for use with (or within) the controller. Other advantages will be apparent to those skilled in the art of memory allocation and error optimization within a memory sub-system discussed hereinafter.

Figure 1A:
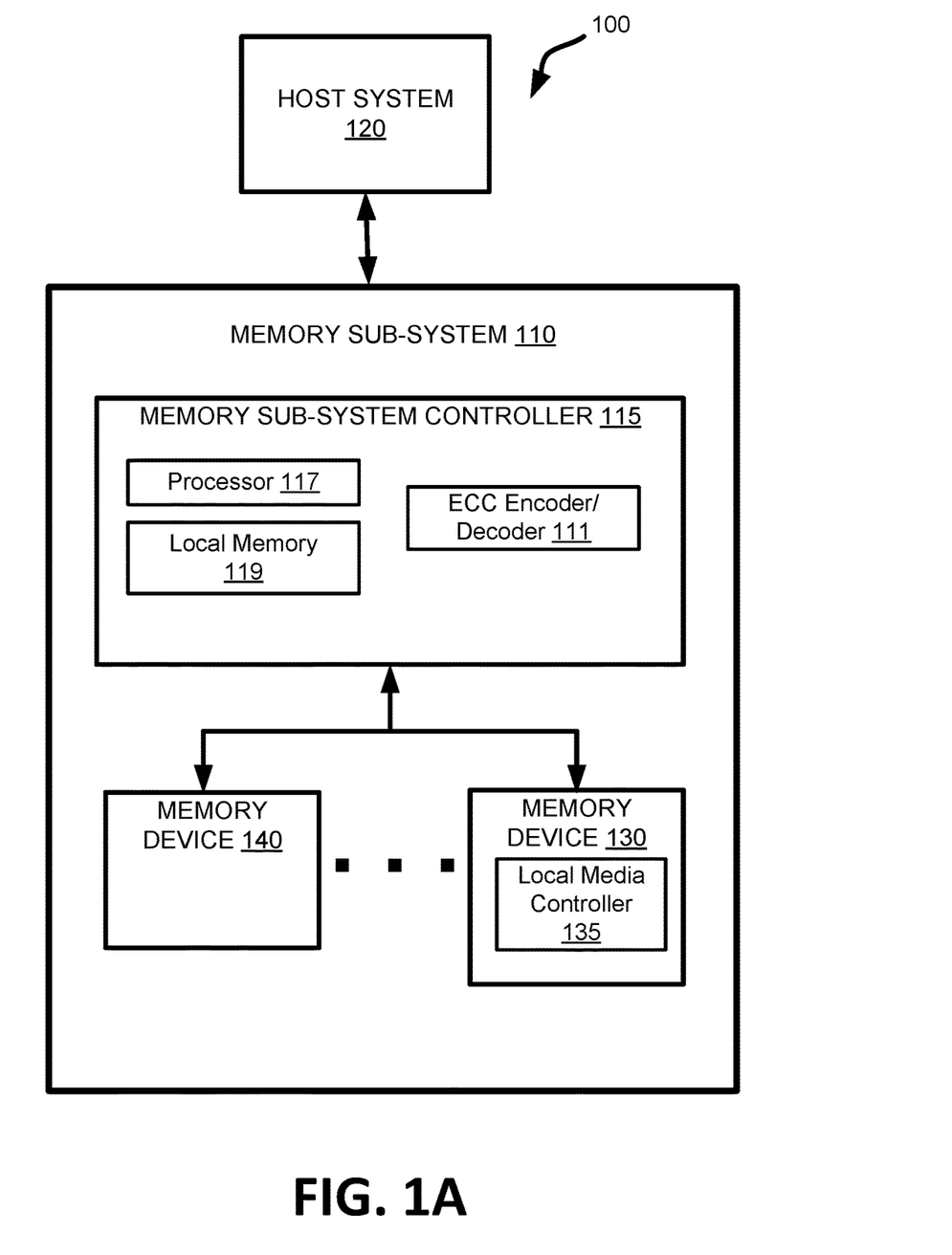
FIG. 1A illustrates an example computing system that includes a memory sub-system according to embodiments.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM(SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device(s)) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 are managed memory devices, which is a raw memory device combined with a local controller (e.g., the local media controller 135) for memory management within the same memory device package or memory die. An example of a managed memory device is a managed NAND (MNAND) device.

In some embodiments, the controller 115 includes an error-correcting code (ECC) encoder/decoder 111. The ECC encoder/decoder 111 can perform ECC encoding for data written to the memory devices 130 and ECC decoding for data read from the memory devices 130, respectively. The ECC decoding can be performed to decode an ECC codeword to correct errors in the raw read data, and in many cases also to report the number of bit errors in the raw read data.

Figure 1B:
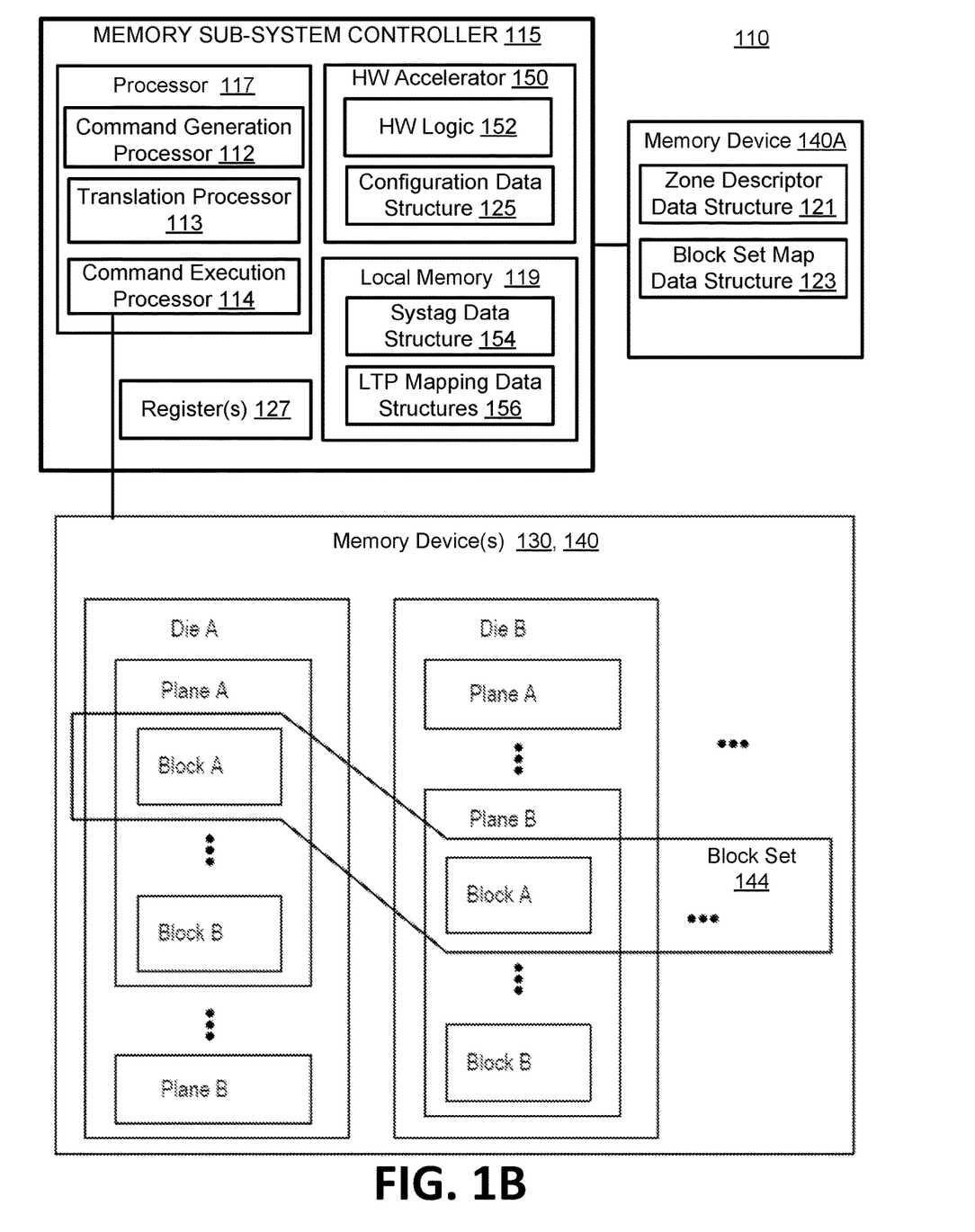
FIG. 1B illustrates the memory sub-system of FIG. 1A in additional detail according to an embodiment.

FIG. 1B illustrates the memory sub-system 110 of FIG. 1A in additional detail according to an embodiment. In one embodiment, the memory sub-system 110 also includes a memory device 140A, which is volatile memory such as DRAM or other main memory, to store a zone descriptor data structure 121 and a block set map data structure 123, as these are usually too large to store on board the controller 115. In various embodiments, the controller 115 includes, within the processor 117, multiple portions of a processing device (or multiple separate processing devices), including a command generation processor 112, a translation processor 113, and a command execution processor 114. The local memory 119 can be, for example, a volatile memory device such as a static random access memory (SRAM) device or a tightly coupled memory (TCM) device, or a combination thereof. This volatile memory device can store a system tag data structure 154 and a logical-to-physical (LTP) mapping data structures 156, which are sufficiently small size to be stored in faster memory such as TCM or SRAM and will be discussed in more detail.

In various embodiments, the controller 115 further includes one or more register(s) 127, which include at least one firmware configurable register, and a hardware accelerator 150 such as a programmable processor or other programmable hardware device. The hardware accelerator 150 can include a hardware logic 152 and a configuration data structure 125. The hardware accelerator 150 can include one or more hardware registers to maintain the configuration data structure 125, which provides information to the hardware accelerator 150 as to the location and manner of indexing within the system tag data structure 154 and the LTP mapping data structures 156, as will be explained. For example, each entry in the configuration data structure 125 can be stored in a separately indexed hardware register. In one embodiment, the hardware accelerator 150 is, or is part of, an LTP batch acceleration translator that includes queues and logic to accelerate the lookups and accumulation of metadata from the LTP mapping data structures 156 in batches, and store the metadata in the system tag data structure 154. Some of the mapping data structures are also discussed in more detail with reference to FIG. 2.

Further, as previously discussed with reference to one or more memory device(s) 130, 140, the physical address space of the multiple dice (e.g., Die A and Die B) can be hierarchically organized by plane, block, and page. So, for example, each of Die A and Die B can include Plane A and Plane B, and each of Plane A and Plane B can include Block A and Block B. A block set (or block stripe) can be defined as a group of blocks arrayed across planes of multiple dice of the memory device(s). As illustrated, a block set 144 is arrayed to include Block A of Plane A of Die A, Block A of Plane B of Die B, and so forth, e.g., also of Plane C of Die C and on to further dice, if present and online.

In various embodiments, the translation processor 113 (and/or a dynamic data placer of the controller 115 coupled to the translation processor 113) dynamically determines a layout in the memory device to place data associated with logical addresses in the physical units or memory components (also referred to as "IC dice") of the memory devices 130, 140. A layout specifies the mapping between the logical addresses used in commands received in the memory sub-system 110 (e.g., from the host system 120) and the physical memory locations in the IC dice of the memory sub-system 110.

The translation processor 113 can determine the layout for a portion of logical addresses of LBA space for the placement of data at the logical addresses associated with physical addresses of IC dice of the memory device 130 or 140, e.g., based on the availability within the memory device to write, program, store, commit data at the time of input/output scheduling in the memory sub-system 110. When IC die(s), including physical units within the IC die(s), are available for committing/programming data, a write command is scheduled for execution in the memory sub-system 110; and the translation processor 113 generates a portion of the layout for the write command and maps the logical address(es) used in the write command to map to physical addresses within the IC die(s). The execution of the write command causes the memory sub-system 110 to commit/program data associated with the write command into the IC die(s).

Depending on availability of IC dice across the media and/or application of a sequential mapping scheme, the controller 115 can either sequentially write data groups (e.g., provided in a sequential stream of data locality) to fill up one IC die at a time or can sequentially write to multiple IC dice at a time, in parallel, e.g., to concurrently fill up the IC dice of the media. The mapping of the writes within the zones of the LBA space can also be done sequentially to simplify the calculations used to perform the mapping, as will be discussed in more detail with reference to ZNS mapping data structures. When there are multiple IC dice available, logical addresses (e.g., LBAs) used in the commands from multiple write streams can be mapped by the dynamically generated portion of the layout to the multiple IC dice respectively, such that there is no media access collision in the execution of the commands from the multiple write streams.

In some embodiments, the translation processor 113 conventionally accesses certain logical-to-physical (LTP) mapping data structures in order to map a logical transfer unit (LTU) identifier (located in a read command and that includes an LBA of a read request) to a physical address of physical address space of the memory device 130. In some embodiments, the translation processor 113 in the context of flash media (e.g., NOR or NAND flash memory) is referred to as flash translation layer (FTL). The mapping employed by the translation processor 113 can generally be assumed to involve a type of block mapping, e.g., block-level mapping or log-block mapping. Where data locality is detected or in a ZNS memory device, the translation processor 113 can map a group of blocks that form a zone, e.g., within the LTP mapping data structures 156. This mapping can involve mapping sequentially numbered LBAs to sequentially numbered physical addresses. The use of the LTP mapping data structures 156, and their interrelation, for mapping LBA space of a zone to physical address space of the media is discussed in more detail with reference to FIGS. 2-3.

In various embodiments, the command generation processor 112 performs command processing, e.g., generating read commands and write commands based on read and write requests, respectively received from the host system 120 or other requesting agent. The command generation processor 112 conventionally buffers the system tags in command memory (e.g., of the local memory 119) and sends the system tags to the translation processor 113. The translation processor 113 conventionally can translate (or map) the LTU identifier of each system tag to a physical address of the physical address space of the memory device 130 or 140. The translation processor 113 can populate each system tag with its corresponding physical address, once translated, and send the system tag back to the command generation processor 112. The command generation processor 112 can then transmit, to the command execution processor 114, a command that includes a system tag in order execute the read request. In some embodiments, the command generation processor 112 transmits a group of read commands at the same time, with sequentially incremented physical addresses, in order to do a look ahead read of sequentially mapped data into buffers of memory. In this way, each system tag includes an LTU identifier for an LTU that is mapped to a physical address.

In these and other embodiments, the command execution processor 124 sequences write and read commands within a channel of a data bus to the memory device(s) 130, 140. The command execution processor 124 can further, in response to receipt of a read command, retrieve the data from the physical address of the memory device 130 or 140 to which the system tag (of the read command) points. Each system tag includes an LTU identifier, which is mapped to a physical address, and a buffer address of a buffer, within a set of memory buffers, to which the command execution processor 124 writes (e.g., caches) the data.

In various read path acceleration embodiments, the hardware accelerator 150 performs the translation of the LTU identifier to the physical address in lieu of the translation processor 113 of the processor 117. More specifically, the command generation processor 112 can store a system tag (of a read command) in the system tag data structure 154 of the hardware accelerator 150. The hardware accelerator 150 (e.g., the hardware logic 152) can then perform the translation by first determining, e.g., calculating, a zone identifier (ID) based on the LTU identifier stored in the system tag. The hardware logic 152 can determine the zone ID, for example, by accessing a zone size value within a firmware configurable register (e.g., one of the registers 127), and calculating the zone ID using the LTU identifier and the zone size value. In one embodiment, this calculating includes dividing a value for the LTU identifier by the zone size value.

In various embodiments, the hardware logic 152 uses the zone ID to do a hash-based index look up within the LTP mapping data structures 156. In one embodiment, the hardware logic 152 can do the hash-based index within a logical-to-physical (LTP) block map data structure (203 in FIGS. 2-3) using the LTU identifier (or LBA) or can use the zone ID combined with the LTU identifier modulo the zone size value. The hardware logic 152 can further retrieve metadata at the indexed locations within the LTP mapping data structures 156 and store the metadata in relation to the system tag in the system tag data structure 154. Although a single system tag is often referenced herein, it is to be understood that the system tag data structure 154 can store numerous system tags and be treated or used similarly to the system tag referenced herein. The indexing, mapping, and accumulation of the metadata will be discussed in more detail with reference to FIG. 3. In disclosed embodiments, the metadata specifies a mapping between the LTU identifier and the physical address. For example, the mapping can be an accelerated translation path from the zone ID to a block set ID, from a block set ID to a block ID, and ultimately from a block ID to a page ID for a page from which the data is to be read in fulfillment of the read request.

In some embodiments, the zone descriptor data structure 121 and the block set map data structure 123 are too large to be located within the local memory 119, depending on design requirements, and thus can be stored in the memory device 140A. If the local memory 119 is sufficiently large, in another embodiment, the zone descriptor data structure 121 and/or the block set map data structure 123 can be stored in the local memory 119. In one embodiment, the zone descriptor data structure 121 is a flat indexed mapping table that is hashed by zone ID (e.g., a hash value of the zone ID), where the zone ID is a value much larger than an LTU identifier. The term "flat" is with reference to a hash-indexed table that is two-dimensional, e.g., a tree or a linked list. The zone descriptor data structure 121 can store the zone descriptor data sent to the controller 115 by the host system 120. In one embodiment, the block set map data structure 123 is a flat indexed mapping table that is indexed by block set ID (e.g., block stripe ID). The block set map data structure 123 can map from the block set ID to physical blocks (e.g., physical block addresses or identifiers) within each die of the media. In one embodiment, the hardware accelerator 150 can manage the block set map data structure 123.

In various embodiments, although the configuration data structure 125 was discussed as being stored in hardware registers of the hardware accelerator, the configuration data structure 125 can also be stored in the local memory 119. The configuration data structure 125 can store hardware information such as data structure entry size within each of the LTP mapping data structures 156, the zone descriptor data structure 121, and within the block set map data structure 123. The configuration data structure 125 can further store the number of bits of an LTU identifier, a zone ID, and other similar information, that the translation processor 113 and the hardware logic 152 can use to translate (e.g., map) each LTU identifier to each physical address when indexing within the mapping data structures referred to herein. Further, the configuration data structure 125 can store pointers to locations of the above referenced data structures in memory, e.g., within the local memory 119 or the memory device 140A, depending on design implementation. The command generation processor 112 of the processor 117 can further point the hardware logic 152 to a location of the configuration data structure 125 at which to initiate the indexing, e.g., by way of first referencing the metadata of the configuration data structure 125 for performing the indexing within the mapping data structures. Use of the configuration data structure 125 for aid in performing the indexing is discussed in more detail with reference to FIG. 3.

Figure 2:
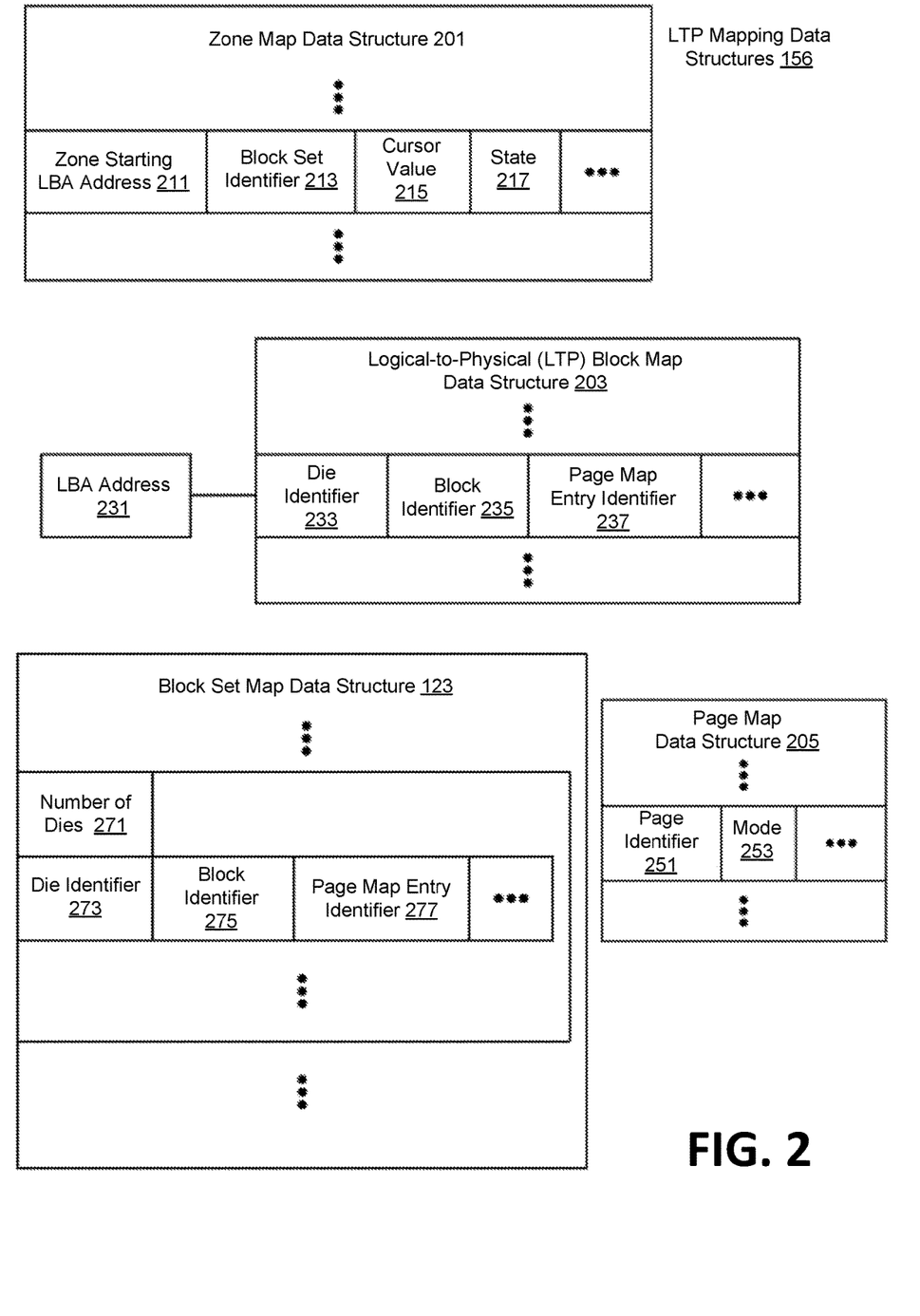
FIG. 2 is a block diagram that illustrates an example of data structures configured to support zone-based mapping according to various embodiments.

FIG. 2 is a block diagram that illustrates an example of data structures configured to support zone-based mapping according to various embodiments. The controller 115 can store some of the data structures illustrated in FIG. 2 in the local memory 119 (e.g., SRAM device and/or TCM device) and others in memory components of the memory device 140, e.g., in DRAM. These data structures can include those referenced as the LTP mapping data structures 156 in FIG. 1B. In FIG. 2, a zone map data structure 201 is configured to provide layout information for a zone in a namespace, e.g., the LBA space for ZNS operation. The zone map data structure 201 can be the same or similar to the zone map data structure 101 of FIG. 1B. The zone map data structure 201 can have multiple entries. Each zone map entry in the zone map data structure 201 identifies information about a zone, such as a starting LBA address 211 of the zone, a block set identifier 213 of the zone, a zone cursor value 215 of the zone, a state 217 of the zone, and the like.

The host system 120 writes data in the zone beginning at the LBA of the zone starting LBA address 211. The host system 120 writes data in the zone sequentially in the LBA space. After an amount of data has been written into the zone, the current starting LBA address for writing subsequent data is identified by the zone cursor value 215. Each write command for the zone moves the zone cursor value 215 to a new starting LBA address for the next write command for the zone. The state 217 can have a value indicating that the zone is empty, full, implicitly open, explicitly open, closed, and the like, to track progress of writing that zone.

In FIG. 2, a logical-to-physical (LTP) block map data structure 203 is configured to facilitate the translation of LBA addresses into physical addresses in the IC dice. The LTP block map data structure 203 can have multiple entries. An LBA can be used as, or converted into, an index (e.g., LTU identifier) for an entry in the LTP block map data structure 203. The LTU identified by the LTU identifier can include a subset of multiple sequential LBAs that includes the LBA. The index can be used to look up an entry for the LBA. Each entry in the LTP block map data structure 203 identifies, for an LBA, the physical address of a block of memory in the IC dice. For example, the physical address of the block of memory in the IC dice can include a die identifier 233, a block identifier 235, a page map entry identifier 237, a page identifier 251, and the like. A die identifier 233 identifies a specific IC die (e.g., Die A or Die B) in the memory device(s) 130, 140 of the memory sub-system 110. A block identifier 235 identifies a specific block of memory (e.g., NAND flash memory) within the IC die that is identified using the die identifier 233. A page map entry identifier 237 identifies an entry in the page map data structure 205.

The page map data structure 205 can have multiple entries. Each entry in the page map 205 can include a page identifier 251 that identifies a page of memory cells within a block of memory cells (e.g., NAND memory cells). For example, the page identifier 251 can include a word line number for the page and a sub block number for the page in the block of NAND memory cells. Further, the entry for the page can include a programming mode 253 of the page. For example, the page can be programmed in an SLC mode, an MLC mode, a TLC mode, or a QLC mode. When configured in the SLC mode, each memory cell in the page is to store one bit of data. When configured in the MLC mode, each memory cell in the page is to store two bits of data. When configured in the TLC mode, each memory cell in the page is to store three bits of data. When configured in the QLC mode, each memory cell in the page is to store four bits of data. Different pages in an integrated circuit die can have different modes for data programming.

In FIG. 2, the block set map data structure 123 stores data controlling aspects of the dynamic layout for a zone. The block set map data structure 123, which can be a table in one embodiment, can have multiple entries. Each block set entry in the block set data structure 123 identifies a number/count 271 of integrated circuit dice (e.g., Die A and Die B) in which data of the zone is stored. For each of the integrated circuit dice used for the zone, the block set entry of the block set map data structure 123 has a die identifier 273, a block identifier 275, a page map entry identifier 277, a page map offset value, and the like.

The die identifier 273 identifies a specific IC die (e.g., Die A or Die B) in the IC dice of the memory sub-system 110, on which IC die subsequent data of the zone can be stored. The block identifier 275 identifies a specific block of memory (e.g., NAND flash memory or other IC dice) within the IC die that is identified using the die identifier 273, in which block the subsequent data of the zone can be stored. The page map entry identifier 237 identifies a page map entry in the page map data structure 205, which identifies a page that can be used to store the subsequent data of the zone.

For example, a memory sub-system 110 receives multiple streams of write commands. In an embodiment, each respective stream in the multiple streams is configured to write data sequentially in a logical address space in one embodiment; and in another embodiment, a stream in the multiple streams is configured to write data pseudo-sequentially, or randomly in a logical address space in one embodiment. Each write stream includes a set of commands that are tagged to write, trim, overwrite a set of data together as a group. In the group, the data can be written in a logical space sequentially, randomly, or pseudo-sequentially. Preferably, the data in the group is written into an erase block set, where memory cells in the erase block set store data for the stream but not data from other streams. The erase block set can be erased to remove the data of the stream without erasing the data of other streams.

For example, each of write streams is permitted to sequentially write at LBAs in a zone in a namespace allocated in the IC dice of the memory device(s) 130, 140 of the memory sub-system 110, but prohibited from writing data out of sequence in the LBA (or logical address) space. The translation processor 113 of the memory sub-system 110 identifies multiple physical units in the memory sub-system 110 that are available to write data concurrently.

The translation processor 113 can select first commands from the multiple streams for concurrent execution in the multiple physical units that are available to write data. The translation processor 113 can generate and store, dynamically in response to the first commands being selected for concurrent execution in the multiple physical units, a portion of a layout that maps from logical addresses identified by the first commands in the logical address space to physical addresses of memory units in the multiple memory units.

The command execution processor 124 can execute the first commands concurrently by storing data into the memory units according to the physical addresses. For example, at the time of scheduling the first commands for execution, execution of second commands can be in progress in a subset of memory units of the IC dice of the memory sub-system 110. Thus, the subset of memory units used for the execution of the second commands are not available for the first commands. After the first commands are scheduled and the portion of the layout for the logical addresses used in the first commands is determined, the first commands can be executed in the multiple physical units concurrently and/or concurrently with the progress of the execution of the second commands in remaining physical units of the memory sub-system 110.

For example, after the identification of the multiple memory units (e.g., IC dice) that are available for the execution of next commands, the translation processor 113 can identify, from the block set map data structure 123, the physical addresses that can be used to store data of the next commands. The physical addresses can be used to update the corresponding entries in the LTP block map data structure 203 for the LBA addresses 231 used in the next commands.

For example, when an IC die is free to write data, the translation processor 113 can determine a command of a zone that can be written/programmed into the memory cells in the IC die. From the block set map data structure 123, the translation processor 113 locates an entry for the zone, locates the block identifier 275 and the page map entry identifier 277 associated with the identifier 273 of the integrated circuit die, and uses the die identifier 273, the block identifier 275, and the page map entry identifier 277 to update the corresponding fields of the entry in the LTP block map data structure 203 for the LBA used in the command of the zone.

Figure 3:
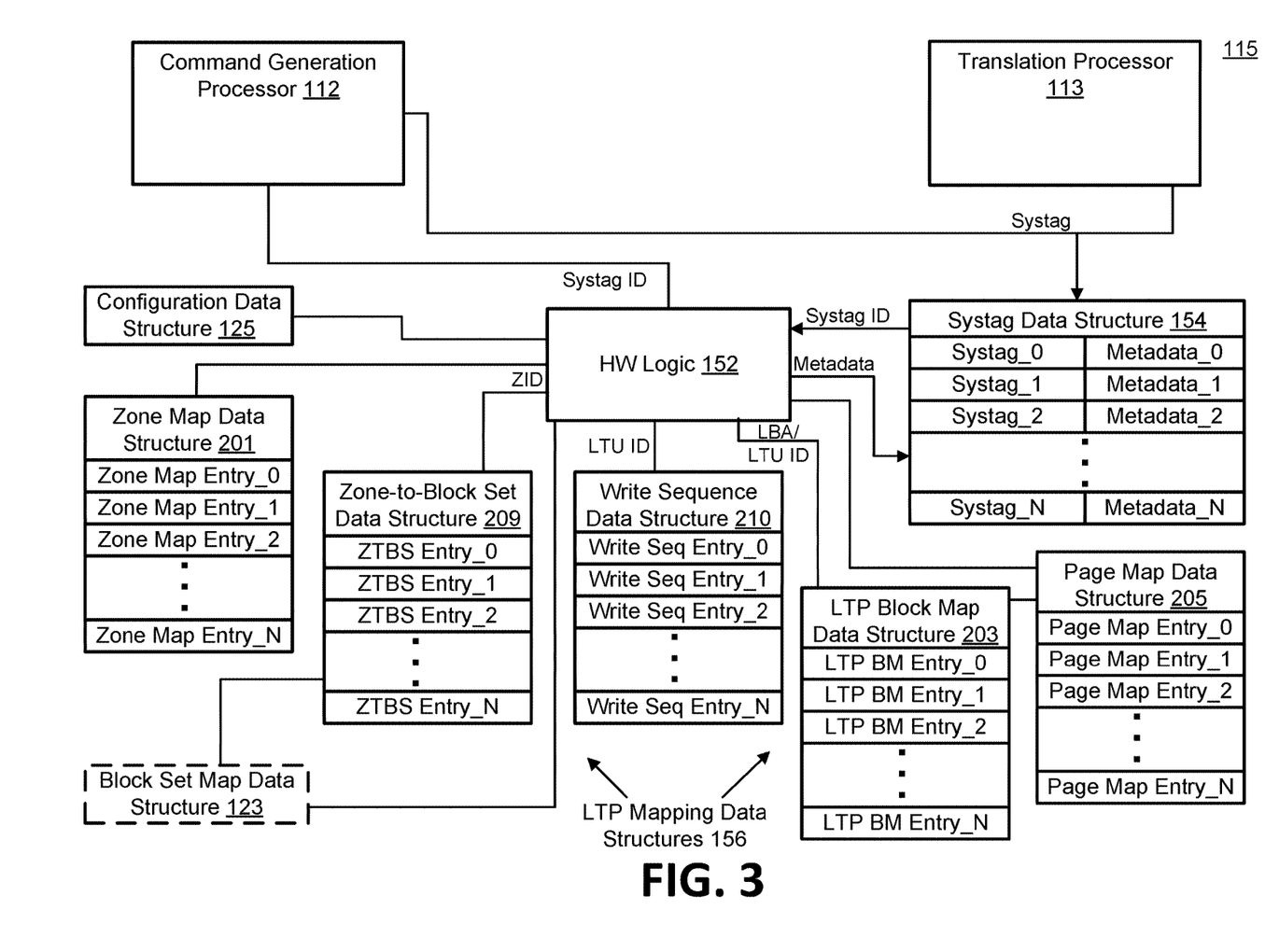
FIG. 3 is a block diagram of interrelationships of a command generation processor, a translation processor, and a hardware accelerator of the controller of FIGS. 1A-1B according to an embodiment.

FIG. 3 is a block diagram of interrelationships of the command generation processor 112, the translation processor 113, and the hardware accelerator 150 of the controller 115 of FIGS. 1A-1B according to an embodiment. In various embodiments, the hardware accelerator 150 includes the hardware logic 152 and the configuration data structure 125. The hardware logic 152 can perform hash-based indexing into the system tag data structure 154 and multiple mapping data structures, including optionally the block map set data structure 123 and the LTP mapping data structures 156. In some embodiments, the LTP mapping data structures 156 include, but are not limited to, the zone map data structure 201 (FIG. 2), the LTP block map data structure 203 (FIG. 2), the page map data structure 205 (FIG. 2), and further a zone-to-block set (ZTBS) data structure 209 and a write sequence data structure 210. As discussed, the mapping data structures can be configured to map an LTU identifier (or LBA of the LTU, depending on data structure) to a physical address of physical address space of the memory device 130 and/or 140.

In various embodiments, the system tag data structure 154 stores multiple entries of a system tag (e.g., systag) that each includes or are indexed against metadata associated with each respective system tag. A processing device such as the command generation processor 112 can process a read request having an LBA, and populate a system tag with an LTU identifier that maps an LTU (having the LBA) to a physical address. The LTU can be mapped to a logical block or a logical page depending on LTU type. The processing device can then store the system tag in the system tag data structure 154. As discussed, a system tag includes an LTU identifier and a buffer identifier. The metadata can specify a mapping (e.g., read path) between the LTU identifier (with the LBA) and a physical address in physical address space of the memory devices 130 and/or 140. The read path can be synonymous with physical address and can include, for example, a die identifier, a block set identifier, a block identifier, and a page identifier. In embodiments, the hardware logic 152 can extract these identifiers of the physical address from the LTP mapping data structures 156, as discussed with reference to FIG. 2 and herein below.

In various embodiments, once the hardware logic 152 stores the metadata in relation to a corresponding system tag in the system tag data structure 154, the hardware logic 152 can send a system tag identifier (ID) for the system tag to the command generation processor 112 of the controller 115. The command generation processor 112 can further generate (or update) a read command using the metadata stored with the system tag in the system tag data structure, and send the read command to the command execution processor 114, which retrieves the data associated with the LTU/LBA to fulfill the read request.

In one embodiment, the zone map data structure 201 is a flat indexed mapping table that is indexed by a hashed zone ID, e.g., a value much larger than a value of the LTU identifier. Each entry in the zone map data structure 201 can contain metadata including a zone state, a zone write pointer submission value, and a zone write pointer completion value. These values can be written at the same time and upon completion of writing to the zone identified by the zone ID. The zone ID can be calculated from the LTU identifier and the zone size value as discussed with reference to FIG. 1B, e.g., by dividing a value for the LTU identifier by the zone size value. In one embodiment, the hardware accelerator 150 manages the zone map data structure 201.

In one embodiment, the ZTBS data structure 209 is a flat indexed mapping table that is indexed by a hashed zone ID value, e.g., a value much larger than a value of the LTU identifier. The translation processor 113, in an embodiment, manages the ZTBS data structure 201. The ZTBS data structure 209 can map the zone ID to a block set identifier (ID) (e.g., block stripe number) that identifies a block set where the data resides. Depending on write granularity, the hardware accelerator 150 can also manage the ZTBS data structure 209.

Additionally, the block set map data structure 123 can be indexed and map from the block set ID to block identifiers (IDs) of physical blocks within the physical address space, e.g., die(s) of the IC dice of the memory devices 130 and/or 140. More specifically, the block set ID within an entry of the ZTBS data structure 209 can index into an entry of the block set map data structure 123 to identify the block identifiers of the physical address space.

In one embodiment, the write sequence data structure 210 is a flat indexed mapping table that is indexed by a hashed LTU identifier or LBA value. The write sequence data structure 210 can track a location of writing to physical addresses of the memory device 130 and 140 to ensure writing to the physical addresses in sequential order per ZNS protocol. In one embodiment, the hardware accelerator can manage the write sequence data structure 210.

In one embodiment, the LTP block map data structure 203 is a flat indexed mapping table that is indexed by a hashed LTU identifier or LBA value. In another embodiment, the LTP block map data structure 203 is indexed using the hashed zone ID combined with the LTU identifier modulo the zone size value. The LTP block map data structure 203 can map the LTU identifier or LBA value to the die identifier 233, the block identifier 235, and the page map entry identifier 237. In one embodiment, the hardware accelerator 150 can manage the LTP block map data structure. In embodiments, the page map data structure 205 is a flat indexed mapping structure that is indexed by the page map entry identifier and can map to the page identifier 251, which is the destination physical address at the end of the read path.

In various embodiments, the configuration data structure 125 is a table of entries that specify access-related metadata for locating and use of each respective data structure of the multiple LTP mapping data structures 156. Each entry, for example, can include a register (e.g., of the registers 127, for a starting address of the data structure, an entry size of the data structure, an identifier mask in an entry of the data structure, and a pointer to another data structure. This pointer can be an identifier of a previously defined data structure, such as the pointer between the ZTBS data structure 209 and the block set map data structure 123.

By way of example, an entry in the configuration data structure 125 for the zone map data structure 201 can include a starting address for the zone map data structure 201, an entry size of the zone map data structure 201, a number of entries in the zone map data structure 201, and an ID mask in an entry that is set to invalid. Each entry, for example, can be stored in a hardware register as discussed with reference to FIG. 1B. By way of a further example, an entry in the configuration data structure 125 for the ZTBS data structure 209 can include a starting address for the ZTBS data structure 209, an entry size of the ZTBS data structure 209, a number of entries of the block set, an ID mask in an entry, a pointer to other data structures to use the ID Mask On (in this case, the block set map data structure 123), a register for the block set map data structure 123, an entry size of the block set map data structure 123, and a number of entries of the block set map data structure 123.

In some embodiments, the entries of the configuration table 125 are layered into the system tag data structure 154, which can enable by-passing the command generation processor 112 when initiating indexing into the mapping data structures. In this way, the controller 115 can avoid having to use the command generation processor 112 (including avoiding the need to access the zone map data structure 201) in the read translation path, which can further lower read processing latency.

In additional embodiments, the hardware accelerator 150 can check to determine whether a zone (associated with the zone ID) is in the correct state (e.g., not the reset state) by allowing the controller 115 to set a range of invalid values and a mask within the configuration data structure 125. More specifically, consider that another field for a maximum value is added to the configuration data structure 125 (e.g., as a register value). Subsequently, the hardware logic 152 can analyze the value of an entry and of an ID mask. The hardware logic 152 can then range check to make sure the data is valid as it has a minimum value of zero and a maximum value specified by the register. In this case, because the controller 115 already set a range of invalid values and the mask, the hardware logic would not allocate a system tag but instead report an error (or the like notification) to the controller 115 indicating something is wrong, thus validating correct state. As an extension to this state check, consider that an explicit minimum value field is also included in the configuration data structure 125 and that the controller 115 can also set the minimum value field. When MIN==MAX, e.g., the minimum value is the same as the maximum value, then the hardware logic 152 can use this to check state by making sure MIN==MAX is same as the value being pulled from the entry and mask.

Figure 4:
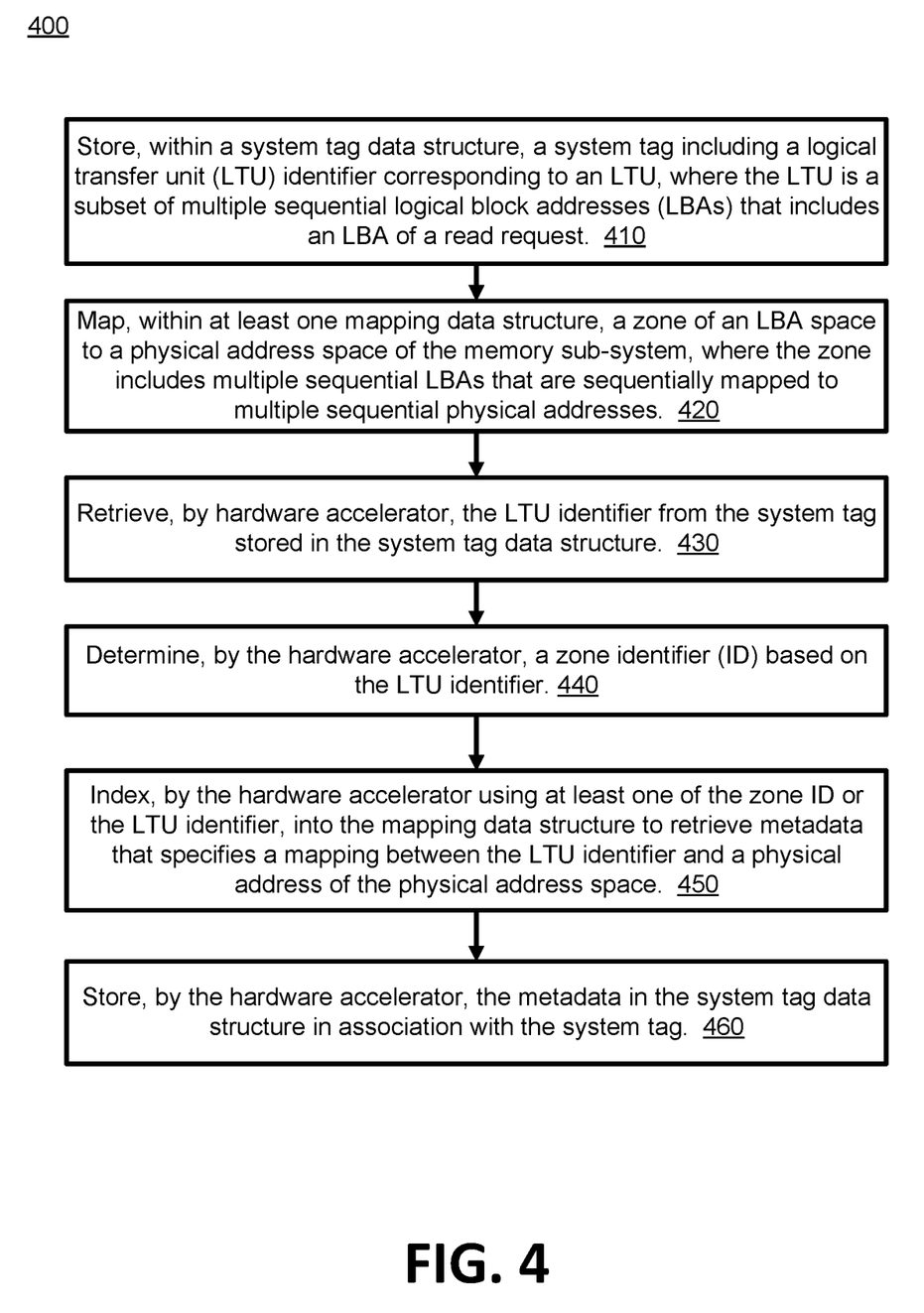
FIG. 4 is a flow chart of a method for accelerated read translation path using a hardware accelerator according to an embodiment.

FIG. 4 is a flow chart of a method 400 for accelerated read translation path using a hardware accelerator according to an embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the controller 115 (e.g., the processor 117 and the hardware accelerator 150) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 4, at operation 410, the processing logic (of the processor 117) stores a system tag received from a processing device of a memory sub-system in the system tag data structure 154 of volatile memory (FIG. 1B; FIG. 3). The system tag can include a logical transfer unit (LTU) identifier corresponding to an LTU. The LTU can be a subset of the plurality of sequential LBAs that includes an LBA of a read request and that is to be mapped to a physical address by the processing logic. In some embodiments, the processing logic can also, or alternatively, check the system tag data structure 154 for an available read command, and populate the read command with the LTU.

At operation 420, the processing logic maps, within at least one mapping data structure, a zone of the LBA space to the physical address space of the memory sub-system. The zone, for example, can include multiple sequential LBAs that are sequentially mapped to multiple sequential physical addresses. This mapping data structure can correspond to the multiple of LTP mapping data structures 156 of FIG. 1B, FIG. 2, and FIG. 3.

At operation 430, the processing logic (of the hardware accelerator 150) retrieves the LTU identifier from the system tag that is stored in the system tag data structure 154 in response to the processor 117 writing the system tag into the system tag data structure 154. The LTU identifier can be what indexes the system tag within the system tag data structure, for example.

At operation 440, the processing logic (of the hardware accelerator 150) determines a zone identifier (ID) based on the LTU identifier. For example, the processing logic can access, with in a firmware configurable register, a zone size value. The processing logic can further calculate the zone ID using the LTU identifier and the zone size value, e.g., by dividing a value for the LTU identifier by the zone size value.

At operation 450, the processing logic (of the hardware accelerator 150) indexes, using at least one of the zone ID or the LTU identifier, into the mapping data structure to retrieve metadata that specifies a mapping between the LTU identifier (an possibly the LBA) and a physical address of the physical address space. The metadata, for example die identifier and block set identifier, can be extracted from matching entries to a hash based value of the zone ID in the zone map data structure 201 and the zone-to-block set data structure 209, as well as indexing from the zone-to-block set data structure 209 with a block identifier into the block set map data structure 123. The metadata can further be extracted from a matching entry to an LTU identifier from a write sequence data structure and a matching entry to the LBA or the LTU identifier within the LTP block map data structure 203. A page map entry identifier for the entry in the LTP block map data structure 203 can further index into the page map data structure 205 to determine a page identifier. From these entries, the metadata (to be stored at operation 460, below) can include at least a physical address (e.g., read path) of a page or a block of memory, including the die identifier 233, the block set identifier 213, the block identifier 235, and a page identifier 251 (see FIG. 2).

At operation 460, the processing logic (of the hardware accelerator 150) stores the metadata in the system tag data structure in association with the system tag. Once stored, the processing logic can notify the processor 117 that the system tag has been populated with the metadata. For example, the processing logic can send the LTU identifier to the command generation processor 112 to indicate that the metadata for the LTU identifier has been stored in the system tag data structure. In response to the notification, the processor 117 (e.g., the command generation processor 112) can retrieve the metadata with which to populate a read command to be sent to the command execution processor 114 to fulfill the read request.

Figure 5:
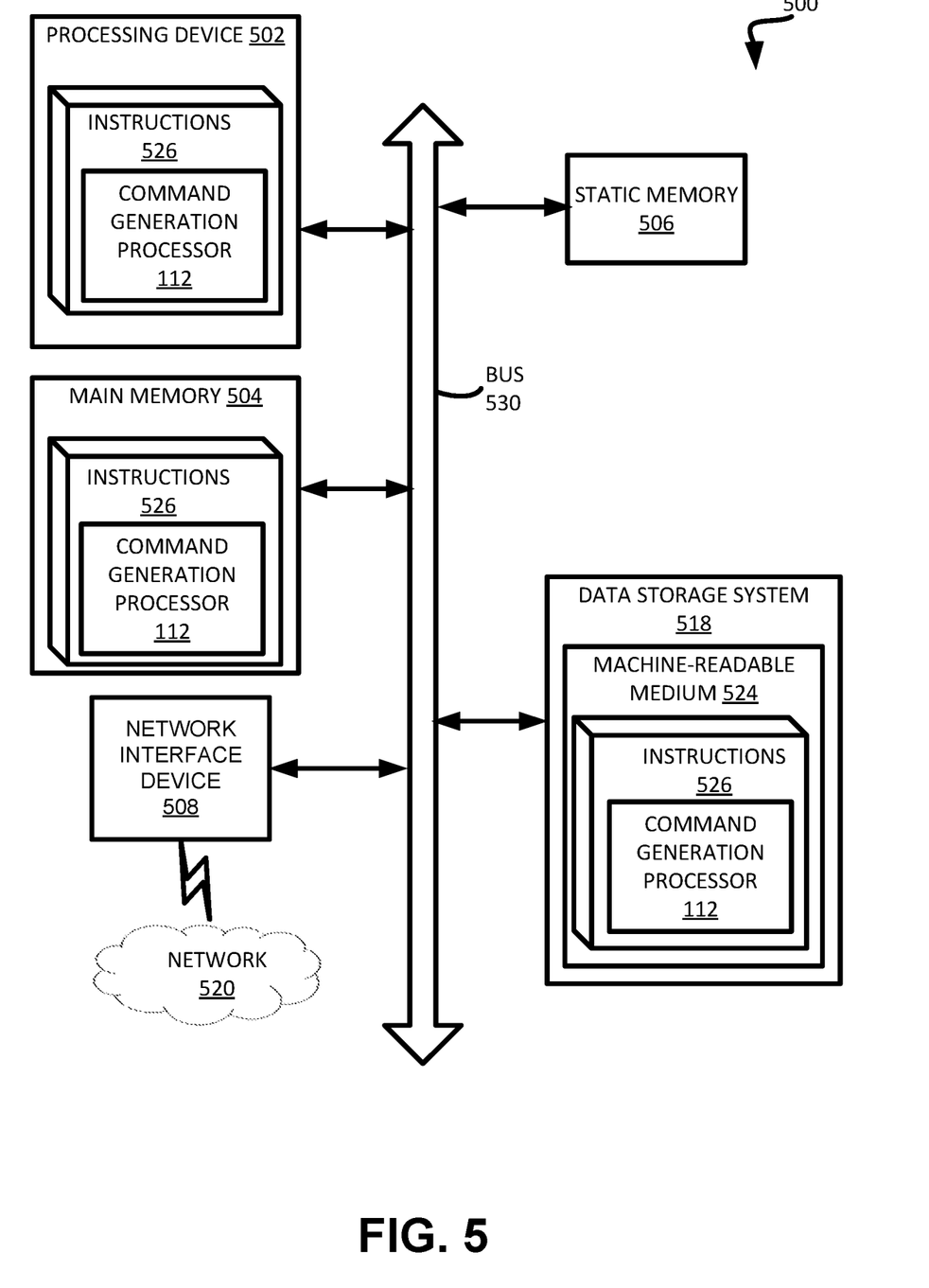
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIGS. 1A-1B.

In one embodiment, the instructions 526 include instructions to implement functionality corresponding to the command generation processor 112 of FIG. 1B. While the machine-readable storage medium 524 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a non-volatile memory device;
a volatile memory device configured to store a mapping data structure that maps a zone of a plurality of zones of logical block address (LBA) space to a physical address space of the non-volatile memory device, wherein the zone comprises a plurality of LBAs that are sequentially mapped to a plurality of physical addresses of the physical address space;
a processing device coupled to the non-volatile memory device and the volatile memory device, the processing device to perform operations comprising: creating a logical transfer unit (LTU) corresponding to an LBA received in a read request, wherein the LTU comprises a subset of a plurality of sequential LBAs of the zone of LBA space of the non-volatile memory device, wherein one of the subset is the LBA; and
a hardware accelerator coupled the volatile memory, the hardware accelerator to perform operations comprising:
retrieving, from the volatile memory device, an LTU identifier associated with the LTU;
determining a zone identifier (ID) based on the LTU identifier;
retrieving, from the mapping data structure, using the zone ID, metadata that specifies a mapping between the LTU identifier and a physical address of a physical address space that includes the plurality of physical addresses; and
storing, to the volatile memory device, the metadata for use used in determining and utilizing the physical address to perform a read operation specified by the read request.

2. The system of claim 1, wherein:
the volatile memory device is configured to further store a system tag data structure;
the operations performed by the processing device further comprise storing a system tag, which contains the LTU identifier for the LTU, in the system tag data structure; and
the operations performed by the hardware accelerator further comprise retrieving the LTU identifier from the system tag in response to the processing device writing the system tag into the system tag data structure.

3. The system of claim 1, wherein operations performed by the hardware accelerator further comprise:
calculating a hash value of the zone ID; and
indexing into the mapping data structure using the hashed zone ID.

4. The system of claim 2, wherein operations performed by the hardware accelerator further comprise:
storing the metadata in the system tag data structure in association with the system tag; and
sending a system tag identifier for the system tag to a command generation processor of the processing device, and wherein the command generation processor of the processing device is further to generate a read command using the metadata stored with the system tag in the system tag data structure.

5. The system of claim 1, wherein the mapping data structure comprises:
a logical-to-physical block map data structure to map the LTU identifier or hash value to a page map entry identifier, wherein the hardware accelerator is to manage the logical-to-physical block map data structure; and
a page map data structure indexed by the page map entry identifier to provide a page identifier.

6. The system of claim 1, wherein, to determine the zone ID, the operations performed by the hardware accelerator further comprise:
accessing, within a firmware configurable register, a zone size value; and
calculating the zone ID using the LTU identifier and the zone size value.

7. The system of claim 1, wherein the mapping data structure comprises a zone map data structure to map the zone ID to a zone state, a zone write pointer submission value, and a zone write pointer completion value, and wherein the operations performed by the hardware accelerator further comprise managing the zone map data structure.

8. The system of claim 1, wherein the mapping data structure comprises:
a zone-to-block set data structure to map the zone ID to a block set ID, wherein the hardware accelerator is to manage the zone-to-block set data structure; and
a block set map data structure to map the block set ID to block identifiers of physical blocks within the physical address space.

9. The system of claim 1, wherein the mapping data structure comprises a write sequence data structure, indexed by the zone ID, to track a location of sequentially writing to physical addresses of the non-volatile memory device, wherein the hardware accelerator is to manage the write sequence data structure.

10. The system of claim 1, wherein the hardware accelerator comprises one or more registers to maintain a configuration data structure, wherein the configuration data structure is to store at least one of:
a number of bits for the LTU identifier;
an entry size for the mapping data structure;
a location of the mapping data structure in the volatile memory device; or
an ID mask in an entry that is set to invalid.

11. A memory controller comprising:
a volatile memory configured to store a mapping data structure that maps a zone of a plurality of zones of logical block address (LBA) space to a physical address space of a non-volatile memory device, wherein the zone comprises a plurality of LBAs that are sequentially mapped to a plurality of physical addresses; and
a processing device comprising hardware logic coupled to the non-volatile memory device and the volatile memory, the hardware logic to perform operations comprising:
creating a logical transfer unit (LTU) corresponding to an LBA received in a read request, wherein the LTU comprises a subset of a plurality of sequential LBAs of the zone of LBA space of the non-volatile memory device, wherein one of the subset is the LBA;
retrieving, from the volatile memory, an LTU identifier associated with the LTU;
determining a zone identifier (ID) based on the LTU identifier;
retrieving, from the mapping data structure, using the zone ID, metadata that specifies a mapping between the LTU identifier and a physical address of a physical address space that includes the plurality of physical addresses; and
storing, to the volatile memory, the metadata used in determining and utilizing the physical address to perform a read operation specified by the read request.

12. The memory controller of claim 11, wherein the volatile memory further comprises a system tag data structure configured to store a system tag comprising the LTU identifier corresponding to the LTU.

13. The memory controller of claim 11, wherein the mapping data structure comprises:
a logical-to-physical block map data structure to map the LTU identifier to a die identifier, a block identifier, and a page map entry identifier, wherein the hardware logic is to manage the logical-to-physical block map data structure; and
a page map data structure indexed by the page map entry identifier to provide a page identifier.

14. The memory controller of claim 11, further comprising one or more registers to maintain a configuration data structure, wherein the configuration data structure is to store at least one of:
a number of bits for the LTU identifier;
an entry size for the mapping data structure; or
a location in memory of the mapping data structure.

15. The memory controller of claim 12, wherein the operations further comprise:
retrieving the LTU identifier from the system tag in response to the processing device writing the system tag into the system tag data structure;
determining a hash value of the zone ID;
indexing, using at least one of the hash value or the LTU identifier, into the mapping data structure to retrieve the metadata; and
storing the metadata in the system tag data structure in association with the system tag.

16. The memory controller of claim 11, wherein, to determine the zone ID, the operations further comprise:
accessing, within a firmware configurable register, a zone size value; and
calculating the zone ID using the LTU identifier and the zone size value.

17. The memory controller of claim 11, wherein the mapping data structure comprises:
a zone map data structure to map the zone ID to a zone state, a zone write pointer submission value, and a zone write pointer completion value, and wherein the hardware logic is to manage the zone map data structure; and
a zone-to-block set data structure to map the zone ID to a block set ID, wherein the hardware logic is to manage the zone-to-block set data structure.

18. The memory controller of claim 11, wherein the mapping data structure comprises a write sequence data structure, indexed by the zone ID, to track a location of sequentially writing to physical addresses of the non-volatile memory device, wherein the hardware logic is to manage the write sequence data structure.

19. A method comprising:
creating, by a processing device of a memory sub-system that includes a non-volatile memory device, a logical transfer unit (LTU) corresponding to a logical block address (LBA) received in a read request, wherein the LTU comprises a subset of a plurality of sequential LBAs of a zone of a plurality of zones of LBA space of the non-volatile memory device, wherein one of the subset is the LBA, and wherein the zone of LBA space is at least a part of a logical address space of a host application mapped to a plurality of physical addresses of the non-volatile memory device;
retrieving, by a hardware accelerator of the memory sub-system from a volatile memory device, an LTU identifier associated with the LTU;
determining a zone identifier (ID) based on the LTU identifier;
retrieving, from a mapping data structure stored in volatile memory, by the hardware accelerator using the zone ID, metadata that specifies a mapping between the LTU identifier and a physical address of a physical address space that includes the plurality of physical addresses; and
storing, by the hardware accelerator, to the volatile memory device, the metadata used in determining and utilizing the physical address to perform a read operation specified by the read request.

20. The method of claim 19, further comprising:

retrieving the LTU identifier from a system tag stored in the volatile memory device in response to the processing device writing the system tag into a system tag data structure;

determining a hash value of the zone ID;

indexing, using at least one of the hash value or the LTU identifier, into a mapping data structure to retrieve the metadata; and storing the metadata in the system tag data structure in association with the system tag.

* * * * *